(12) United States Patent
Fujioka et al.

(10) Patent No.: US 11,320,529 B2
(45) Date of Patent: May 3, 2022

(54) MARITIME TARGET AND WAKE TRACKING DEVICE, METHOD AND PROGRAM

(71) Applicant: Furuno Electric Co., Ltd., Nishinomiya (JP)

(72) Inventors: Daisuke Fujioka, Nishinomiya (JP); Katsuyuki Yanagi, Kakogawa (JP); Suminori Ekuni, Nishinomiya (JP); Yugo Kubota, Ashiya (JP)

(73) Assignee: Furuno Electric Co., Ltd., Nishinomiya (JP)

( * ) Notice: Subject to any disclaimer, the term of this patent is extended or adjusted under 35 U.S.C. 154(b) by 398 days.

(21) Appl. No.: 16/548,479

(22) Filed: Aug. 22, 2019

(65) Prior Publication Data

US 2020/0064459 A1 Feb. 27, 2020

(30) Foreign Application Priority Data

Aug. 27, 2018 (JP) .............................. JP2018-157906

(51) Int. Cl.
*G01S 13/46* (2006.01)
*G01S 13/937* (2020.01)
(Continued)

(52) U.S. Cl.
CPC .............. *G01S 13/46* (2013.01); *G01S 7/292* (2013.01); *G01S 7/2955* (2013.01); *G01S 13/56* (2013.01); *G01S 13/68* (2013.01); *G01S 13/937* (2020.01)

(58) Field of Classification Search
CPC ........ G01S 13/46; G01S 7/292; G01S 7/2955; G01S 13/56; G01S 13/68; G01S 13/937;
(Continued)

(56) References Cited

U.S. PATENT DOCUMENTS 8,437,509 B1 * 5/2013 Hallenborg ............ G06V 20/13
382/107
2018/0047174 A1 * 2/2018 Murata .................... G06T 7/251

FOREIGN PATENT DOCUMENTS

EP 2345907 A2 * 7/2011 ............. G01S 13/42
EP 2345907 A2 7/2011
(Continued)

OTHER PUBLICATIONS

Rodningsby, et al, "Multitarget Tracking in the Presence of Wakes"; Proceedings of FUSION 2008, Cologne, Germany. (Year: 2008).*
(Continued)

*Primary Examiner* — Donald H B Braswell
(74) *Attorney, Agent, or Firm* — Alleman Hall Creasman & Tuttle LLP

(57) ABSTRACT

A tracking device is provided, which may include a correction target area setting module configured to set an area in which an unnecessary echo tends to be generated based on a structure or behavior of a ship, as a correction target area, a correction target echo extracting module configured to extract a target object echo within the correction target area from a plurality of detected target object echoes, as a correction target echo, a scoring module configured to score a matching level between previous echo information on a target object echo and detected echo information on each of the target object echoes, based on the previous echo information, the detected echo information and the extraction result, and a determining module configured to determine a target object echo as a current tracking target by using the scored result.

15 Claims, 9 Drawing Sheets

(51) Int. Cl.
   *G01S 7/292* (2006.01)
   *G01S 13/56* (2006.01)
   *G01S 7/295* (2006.01)
   *G01S 13/68* (2006.01)

(58) Field of Classification Search
   CPC ...... G01S 7/414; G01S 13/426; G01S 13/726;
   G01S 7/415; G01S 13/72
   See application file for complete search history.

(56) References Cited

FOREIGN PATENT DOCUMENTS

| | | |
|---|---|---|
| EP | 2345907 A3 | 4/2014 |
| JP | 3508000 B2 | 3/2004 |

OTHER PUBLICATIONS

European Patent Office, Extended European Search Report Issued in Application No. 19193066.8, dated Jan. 17, 2020, Germany, 9 pages.
Redningsby, A et al., "Multitarget Tracking in the Presence of Wakes," 2008 11th International Conference on Information Fusion, Jun. 30, 2008, 8 pages.

* cited by examiner

| TARGET OBJECT ECHO | REP. POINT | CORRECTION TARGET | SCORE | TRACKING TARGET |
|---|---|---|---|---|
| ED1 | EP1 | NO | 90 | O |
| ED2 | EP2 | YES | 92→50 | - |
| ED3 | EP3 | YES | 60→33 | - |
| ED4 | EP4 | YES | 39→21 | - |
| ED5 | EP5 | YES | 94→51 | - |
| ED6 | EP6 | YES | 58→32 | - |
| ED7 | EP7 | YES | 40→22 | - |
| ED8 | EP8 | YES | 32→17 | - |

FIG. 6

MARITIME TARGET AND WAKE TRACKING DEVICE, METHOD AND PROGRAM

CROSS-REFERENCE TO RELATED APPLICATION(S)

This application claims priority under 35 U.S.C. § 119 to Japanese Patent Application No. 2018-157906, which was filed on Aug. 27, 2018, the entire disclosure of which is hereby incorporated by reference.

TECHNICAL FIELD

The present disclosure relates to a technology to track a target object which moves on water surface, such as a ship.

BACKGROUND

There is a device which estimates a movement of a target object using a radar.

The target object may be tracked by using such an estimated result of the movement of the target object.

However, the target object which moves on water surface creates wakes while traveling. The position of echoes of the wakes is close to the position of an echo of the target object. In addition, the size (area) of the echoes of the wakes may also be close to the size (area) of the echo of the target object.

Therefore, conventionally, the device may mistakenly track wakes, instead of the target object to be tracked.

SUMMARY

Therefore, one purpose of the present disclosure is to provide a technology to track a target object to be tracked more securely.

A tracking device according to one aspect of the present disclosure may include a correction target area setting module, a correction target echo extracting module, a scoring module and a determining module. The correction target area setting module may set an area in which an unnecessary echo tends to be generated based on one of a structure and behavior of one of a ship, to be a correction target area. The correction target echo extracting module may extract a target object echo within the correction target area from a plurality of detected target object echoes, as a correction target echo. The scoring module may score a matching level between previous echo information on a target object echo that is a previous tracking target and detected echo information on each of the plurality of detected target object echoes, based on the previous echo information, the detected echo information, and the extraction result by the correction target echo extracting module. The determining module may determine a target object echo as a current tracking target from the plurality of target object echoes, by using the scored result.

According to this configuration, the target object echo within the correction target area and the target object echo outside the correction target area can be scored by using different scoring methods. Therefore, a scoring point of the target object echo within the correction target area can be set to be relatively lower than that of the target object echo outside the correction target area.

BRIEF DESCRIPTION OF DRAWINGS

The present disclosure is illustrated by way of example and not by way of limitation in the figures of the accompanying drawings, in which like reference numerals indicate like elements and in which:

FIG. 6 is a table illustrating a concept of scoring;

DETAILED DESCRIPTION

A tracking device, a tracking method, and a tracking program according to one embodiment of the present disclosure will be described with reference to the drawings.

Figure 1:
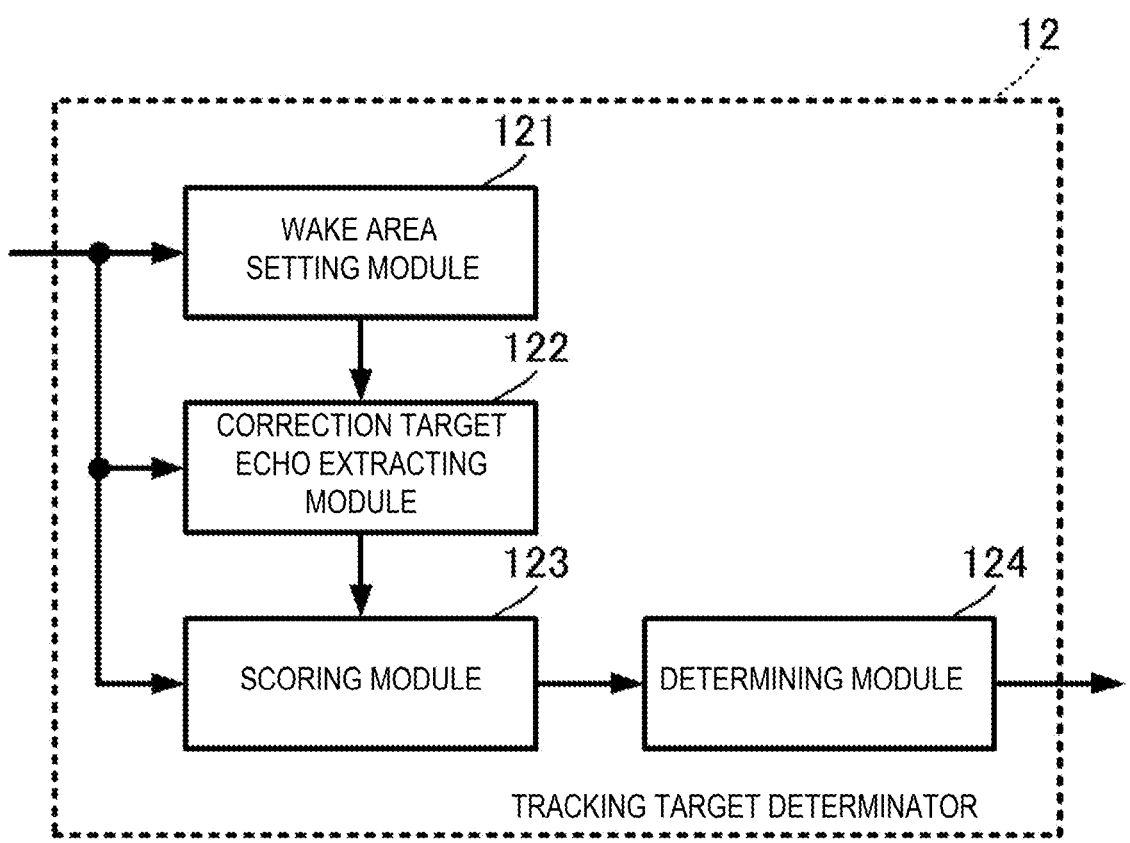
FIG. 1 is a block diagram illustrating a configuration of a tracking target determinator.
Figure 2:
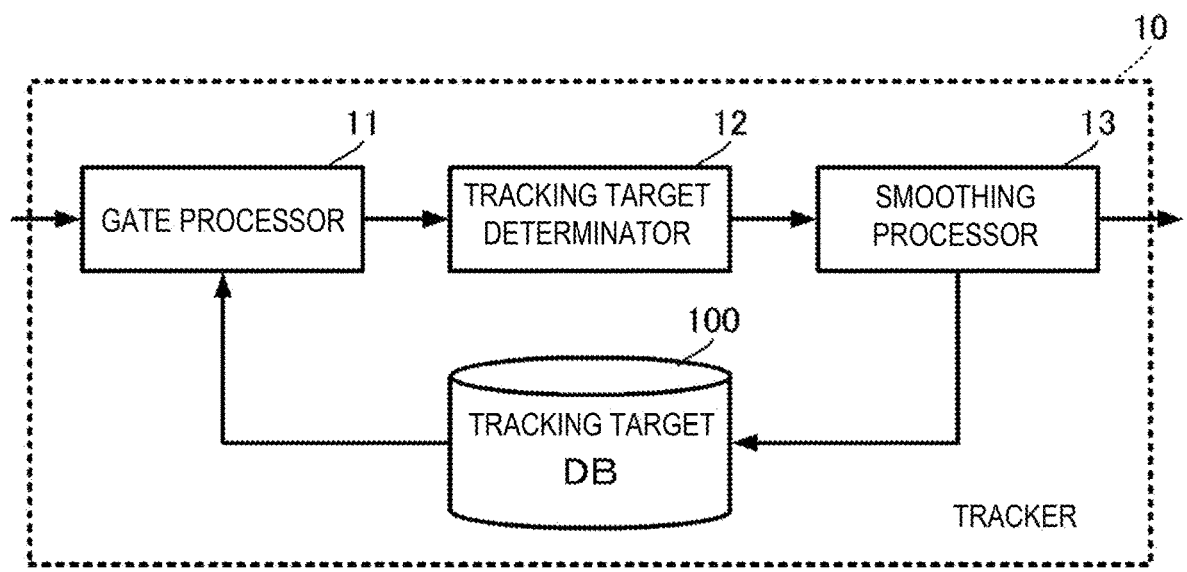
FIG. 2 is a block diagram illustrating a configuration of a tracker according to one embodiment of the present disclosure.
Figure 3:
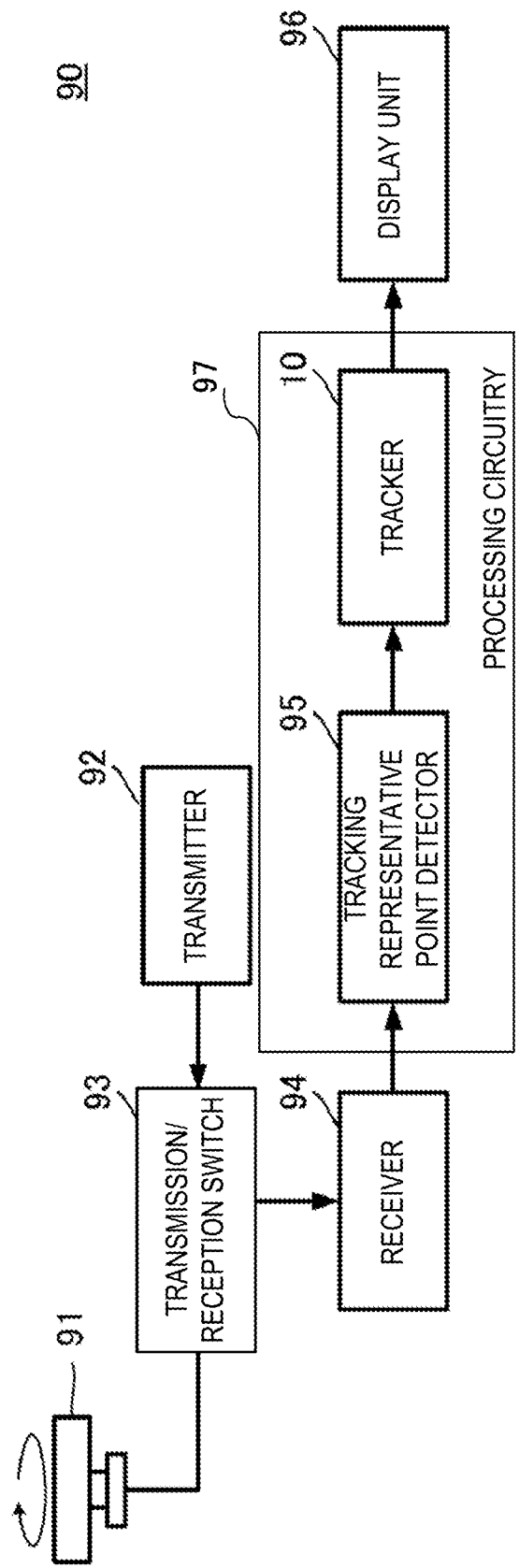
FIG. 3 is a block diagram illustrating a configuration of a radar device according to the embodiment of the present disclosure.
Figure 4:
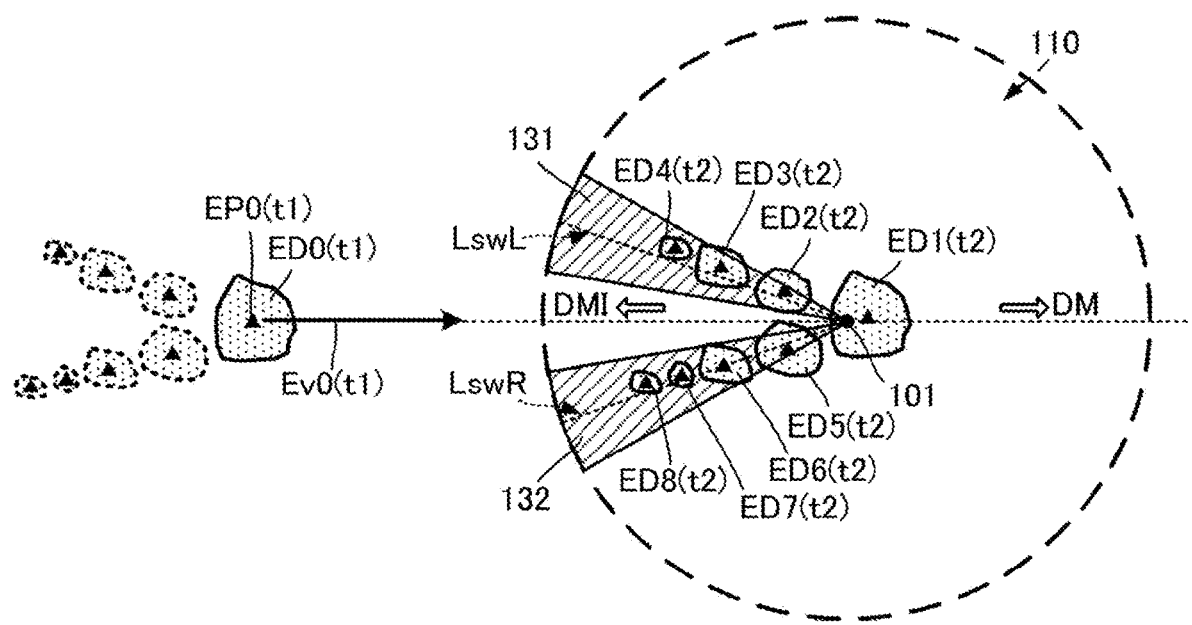
FIG. 4 is a view illustrating a concept of tracking.
Figure 5:
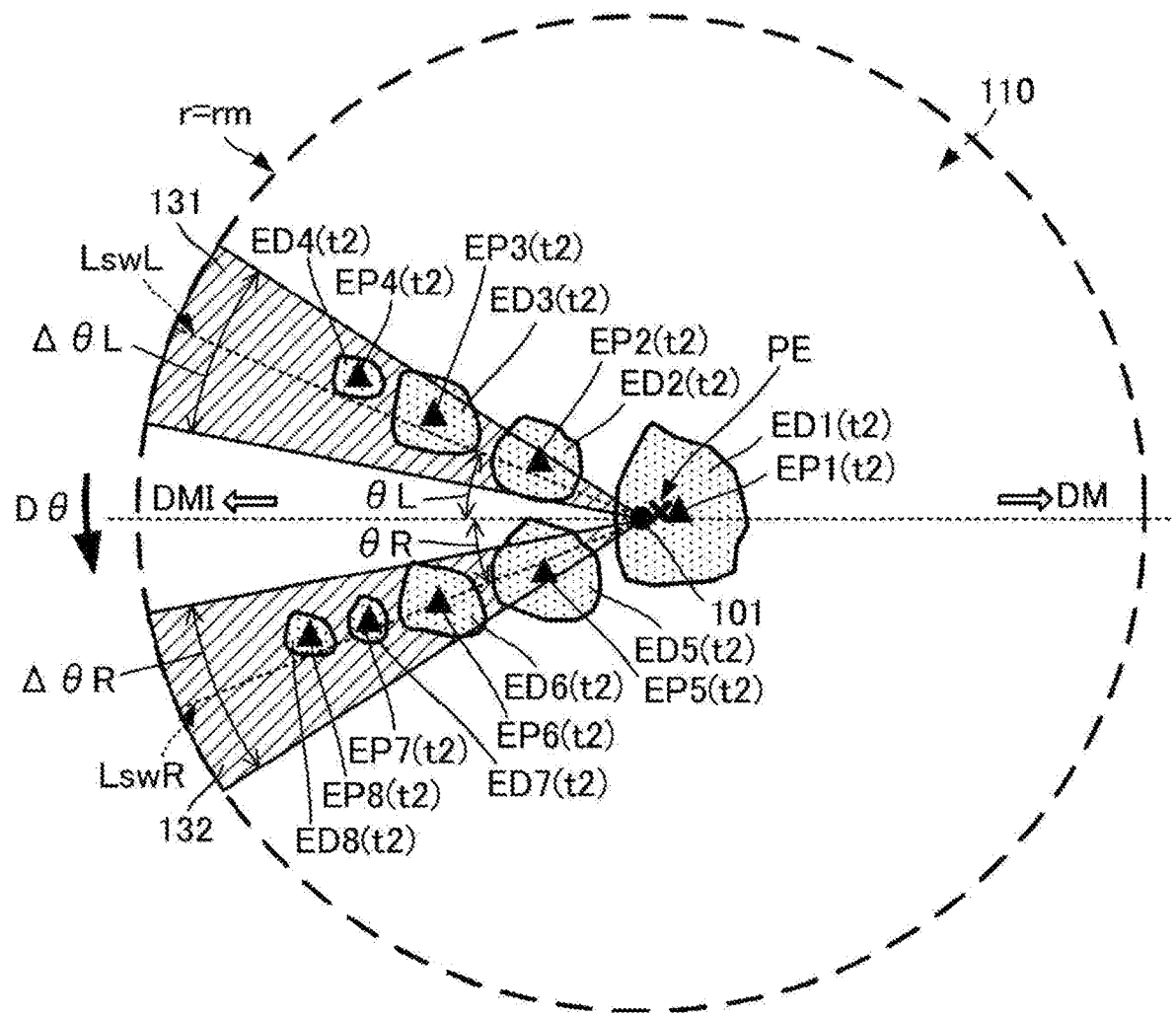
FIG. 5 is an enlarged view of a target area of a tracking detection of this time.

FIG. 1 is a block diagram illustrating a configuration of a tracking target determinator according to this embodiment. FIG. 2 is a block diagram illustrating a configuration of a tracker according to this embodiment. FIG. 3 is a block diagram illustrating a configuration of a radar device according to this embodiment. Note that, although the tracker illustrated in FIG. 2 corresponds to the "tracking device" of the present disclosure, the tracking device may desirably be provided with at least the tracking target determinator. FIG. 4 is a view illustrating a concept of tracking. FIG. 5 is an enlarged view of a target area of a tracking detection of this time in FIG. 4.

Configuration of Radar Device 90

As illustrated in FIG. 3, a radar device 90 may include an antenna 91, a transmitter 92, a transmission/reception switch 93, a receiver 94, processing circuitry 97 which includes a tracking representative point detector 95 and a tracker 10, and a display unit 96. Note that a configuration of the radar device 90 other than the tracker 10 may be similar to a known configuration, and therefore, the known configuration will be described briefly. Although the tracker 10 may be used as a sole tracking device, it may be also usable as a part of the radar device 90 as illustrated in FIG. 3.

The transmitter 92 and the receiver 94 may be connected with the antenna 91 through the transmission/reception switch 93. The receiver 94 may be connected to the tracking representative point detector 95. The tracking representative point detector 95 may be connected to the tracker 10. The tracker 10 may be connected to the display unit 96. For example, the transmitter 92 and the receiver 94 are each implemented by an electric circuit or an electronic circuit. For example, the transmission/reception switch 93 is implemented by a signal transmission member which realizes a spectral separation circuit, such as a wave guide tube or a strip line. For example, the tracking representative point detector 95 and the tracker 10 are implemented by a program for implementing these functional parts, a recording medium which records the program, and an arithmetic processing device, such as a CPU, which executes the program. For example, the display unit 96 is implemented by a liquid crystal display.

The transmitter 92 may generate and output a detection signal. The transmission/reception switch 93 may transmit the detection signal to the antenna 91.

The antenna 91 may be attached to a water surface movable body, such as a surface ship. While rotating a wave transmission-and-reception surface at a given cycle, the antenna 91 may transmit the detection signal externally (i.e., to a detection area) and receive an echo signal.

The antenna 91 may output the echo signal to the transmission/reception switch 93. The transmission/reception switch 93 may transmit the echo signal to the receiver 94.

For the echo signal, the receiver 94 may perform known reception processings, such as a detection, an A/D conversion, and an amplification to generate echo data. The echo data may be converted into a rectangular coordinate system which constitutes a PPI image. The receiver 94 may output the echo data to the tracking representative point detector 95.

The tracking representative point detector 95 may extract echo data having a signal intensity more than a detection threshold, and detect a representative point for every extracted target object echo. For example, the representative point of the target object echo is expressed by coordinates of the rectangular coordinate system which constitutes the PPI image, which are coordinates of the center of gravity of the target object echo, etc. The tracking representative point detector 95 may also calculate an area of the target object echo. For example, the area of the target object echo is expressed by a gross area of pixels of an echo data group which constitutes the target object echo. The tracking representative point detector 95 may generate echo information including the representative point of the target object echo and the area of the target object echo. Here, the tracking representative point detector 95 may generate the echo information for every target object echo.

The tracking representative point detector 95 may output the echo data, and the echo information for every target object echo to the tracker 10.

Briefly the tracker 10 may detect the target object echo to be tracked from a plurality of target object echoes, for which the representative points have been detected, by using the echo information for every target object echo, and then track the target object echo to be tracked. Here, although the details will be described later, the tracker 10 may set a wake area using an estimated position based on the echo information on the target object echo of the target object tracked in the past (past echo information). The tracker 10 may score the plurality of target object echoes for which the representative points have been detected, according to a degree of coincidence (or a matching level) of the target object echo to be tracked to the echo information. Here, the tracker 10 may perform the scoring by using different scoring methods for the target object echo within the wake area and the target object echo outside the wake area. For example, when the target object echo is within the wake area, the tracker 10 scores the target object echo to be lower (lower scoring point) than when the target object echo is outside the wake area (i.e., not within the wake area). Then, the tracker 10 may detect a target object echo with the highest scoring point as the target object echo to be tracked.

The tracker 10 may output various kinds of information acquired by the tracking (tracking information) to the display unit 96, along with the echo data and the echo information. Note that the tracking information may include an estimated position and an estimated speed of the target object echo to be tracked.

The display unit 96 may display a detection image around the radar device 90 based on the echo data. Further, the display unit 96 may also display the tracking information and various kinds of symbols based on the tracking information on the detection image.

Configuration of Tracker 10

As illustrated in FIG. 2, the tracker 10 may include a gate processor 11, a tracking target determinator 12, a smoothing processor 13, and a tracking target database (DB) 100.

The gate processor 11 may calculate an estimated position 101 of the target object echo to be tracked (refer to FIGS. 4 and 5) at a timing (time point) of a tracking detection of this time based on the past tracking information on the target object echo to be tracked. The gate processor 11 may determine a scoring target area 110 using the estimated position 101. Note that the estimated position 101 can be calculated based on the past echo information on the target object echo to be tracked. For example, the estimated position 101 can be calculated based on an estimated position and an estimated velocity vector of the target object echo to be tracked at the last detection timing, and a time difference between a detection timing of last time and a detection timing of this time.

For example, as illustrated in FIGS. 4 and 5, the scoring target area 110 is a circular area of a radius "rm" centering on the estimated position 101. Note that the size of the scoring target area 110 can be adjusted suitably, and, for example, is adjusted according to an estimated speed which can be obtained from the past echo information on the target object echo to be tracked. The size of the scoring target area 110 may be adjusted so that it is increased as the estimated speed increases.

The gate processor 11 may extract a target object echo which exists within the scoring target area 110 at the tracking detection timing of this time.

The gate processor 11 may output the representative point of the extracted target object echo to the tracking target determinator 12, along with the echo information.

Thus, the gate processor 11 may narrow down the plurality of detected target object echoes to those having a certain or more possibility of becoming targets to be tracked. Therefore, the processing load when performing a determination of the tracking targets (described later) can be reduced rather than when the determination is applied to all the detected target object echoes.

As illustrated in FIG. 1, the tracking target determinator 12 may include a wake area setting module 121, a correction target echo extracting module 122, a scoring module 123, and a determining module 124. Note that the wake area setting module 121 may correspond to a "correction target area setting module" of the present disclosure.

As illustrated by oblique-hatched areas of FIGS. 4 and 5, the wake area setting module 121 may set wake areas 131 and 132 on the basis of the estimated position 101.

In detail, the wake area setting module 121 may set an opposite direction DMI to an estimated moving direction DM on the basis of the estimated position 101. The estimated moving direction DM can be determined based on a velocity vector obtained from the past echo information of the target object echo to be tracked. Therefore, the opposite direction DMI can be determined based on a reverse vector of the velocity vector.

In more detail, the wake area setting module 121 may set the wake area 131 in a fan shape having the estimated position 101 at its vertex. The fan may have an arc which is a part of the circle forming the scoring target area 110 on the opposite direction DMI side and the port side. In one example of this setting method, the wake area setting module 121 may set a wake reference line LswL. The wake reference line LswL may be a straight line which passes through the estimated position 101 and form an angle θL on the port side with respect to the opposite direction DMI. Next, the wake area setting module 121 may set, as the wake area 131, a fan area which spreads at an angle ΔθL on the basis of the estimated position 101 so as to include a direction in which the wake reference line LswL extends. In more detail, the direction in which the wake reference line LswL extends may desirably be set so as to pass through the center of the angle ΔθL in the angular direction (a direction along the circumference) Dθ.

Moreover, the wake area setting module 121 may set the wake area 132 in a fan shape having the estimated position 101 at its vertex. The fan may have an arc which is a part of the circle forming the scoring target area 110 on the opposite direction DMI side and the starboard side. In one example of this setting method, the wake area setting module 121 may set a wake reference line LswR. The wake reference line LswR may be a straight line which passes through the estimated position 101 and forms an angle θR on the starboard side with respect to the opposite direction DMI. Next, the wake area setting module 121 may set, as the wake area 132, a fan area which spreads at an angle ΔθR on the basis of the estimated position 101 so as to include a direction in which the wake reference line LswR extends. In more detail, the direction in which the wake reference line LswR extends may desirably be set so as to pass through the center of the angle ΔθR in the angular direction (the direction along the circumference) Dθ.

The angle θL (corresponding to an angle formed by the wake reference line LswL and the opposite direction of the moving direction of the water surface movable body), and the angle θR (corresponding to an angle formed by the wake reference line LswR and the opposite direction of the moving direction of the water surface movable body) are desirably set as about 19.47°, respectively. This may be based on the wakes spreading with an angle of about 39° in the opposite direction of the moving direction, without being influenced by the shape and the speed of the movable body (ship etc.).

Moreover, the angle ΔθL and the angle ΔθR may be set as about 20°. That is, the wake area 131 and the wake area 132 may form the angles of about 19.47° to the opposite direction DMI while passing through the estimated position 101, and, for example, may each be set with a spreading of about ±10° in the angular direction.

By such processing, the wake area setting module 121 can set areas where echoes tend to be caused by the wakes.

The wake area setting module 121 may output the wake area 131 and the wake area 132 to the correction target echo extracting module 122. The wake area 131 and the wake area 132 can be set, for example, by coordinates of the vertexes of the fans.

The correction target echo extracting module 122 may compare the coordinates of each representative point of the plurality of target object echoes with the wake area 131 and the wake area 132. The correction target echo extracting module 122 may extract representative points which exist within the wake area 131 or the wake area 132.

The correction target echo extracting module 122 may set the target object echoes having the extracted representative points as target object echoes to be corrected. On the other hand, the correction target echo extracting module 122 may not set the target object echoes including the representative points which have not been extracted as the target object echoes to be corrected.

The correction target echo extracting module 122 may detect whether each of the plurality of target object echoes extracted by the gate processor 11 is a candidate for correction, and generate this detection result as correction information. The correction target echo extracting module 122 may output the plurality of target object echoes and the respective correction information to the scoring module 123.

The scoring module 123 may score a degree of coincidence between the target object echo to be tracked and each of the plurality of target object echoes (detected echo information) extracted by the gate processor 11. Here, the scoring module 123 may use, as the target object echo to be tracked, the target object echo detected as the target to be tracked at the timing of the last tracking detection, for example.

The scoring module 123 may perform the scoring according to the degree of coincidence of the echo information by using the echo information on the plurality of target object echoes (target object echoes to be scored), and the echo information and the estimated position 101 of the target object echo to be tracked. For example, the scoring may be set so that the degree of coincidence becomes higher as the scoring point increases.

In more detail, the scoring module 123 may execute the scoring by the following calculation for each of the plurality of target object echoes.

The scoring module 123 may extract the position of the representative point and the area of the target object echo from the echo information on the target object echo to be scored. The scoring module 123 may extract the area of the target object echo to be tracked from the echo information on the target object echo to be tracked.

The scoring module 123 may calculate a distance difference between the position of the representative point of the target object echo to be scored and the estimated position 101. The scoring module 123 may also calculate a difference or a ratio of the area of the target object echo for which the representative point is acquired, and the area of the target object echo to be tracked.

The scoring module 123 may set the scoring point using the distance difference and the area difference or ratio. In more detail, the scoring module 123 may make the scoring point higher as the distance difference becomes smaller, and make the scoring point higher as the area difference becomes smaller or the area ratio becomes closer to 1. Then, the scoring module 123 may calculate the scoring point of the target object echo to be scored by, for example, adding the scoring point by the distance difference to the scoring point by the area difference or ratio.

Here, the scoring module 123 may weight differently to the scoring between the target object echo which is included within the wake area 131 or the wake area 132 and the target object echo which is not included within the wake area 131 and the wake area 132.

For example, the scoring module 123 changes the scoring method according to whether the representative point of the target object echo to be scored is included within the wake area 131 or the wake area 132.

Concretely, the scoring module 123 may deduct the scoring point when the representative point of the target object echo to be scored is included within the wake area 131 or the wake area 132. On the other hand, the scoring module 123 may not deduct the scoring point when the representative point of the target object echo to be scored is not included within the wake area 131 and the wake area 132.

Alternatively, the scoring module 123 may add the scoring point when the representative point of the target object echo to be scored is not included within the wake area 131 and the wake area 132, and, on the other hand, may not add the scoring point when the representative point of the target object echo to be scored is included within the wake area 131 or the wake area 132.

Alternatively, the scoring module 123 may deduct the scoring point when the representative point of the target object echo to be scored is included within the wake area 131 or the wake area 132, and, on the other hand, add the scoring point when the representative point of the target object echo to be scored is not included within the wake area 131 and the wake area 132.

The scoring module 123 may output the scored result of the plurality of target object echoes as the candidates of the scoring to the determining module 124.

The determining module 124 may detect the target object echo with the highest degree of coincidence as a target object echo to be tracked. That is, the determining module 124 may detect the target object echo with the highest scoring point as the target object echo to be tracked for this time.

By using the configuration and the processing as described above, the scoring point of the target object echo within the wake area 131 or the wake area 132, i.e., the target object echo with the high possibility of being the echo of the wake, may become lower.

Therefore, the tracker 10 can reduce a misdetection of the echo of the wake as the target object echo to be tracked. Therefore, the tracker 10 can detect the target object echo to be tracked more securely, and thereby, the tracking performance may improve.

Further, in this configuration, the wake area may not be set in the opposite direction DMI, and the wake area 131 and the wake area 132 may be set so as to be separated from each other sandwiching the opposite direction DMI. Therefore, even if the speed of the movable body becomes slower, it can prevent that the echo of the movable body enters into the wake area 134 and the wake area 135. Therefore, even if the speed of the movable body becomes slower, it may reduce the misjudgment of the echo of the movable body as the echo of the wake. Therefore, the tracker 10 may detect the target object echo to be tracked more accurately, and thereby, the tracking performance may improve.

The determining module 124 may output the detected target object echo to be tracked and the echo information to the smoothing processor 13.

The smoothing processor 13 may perform a smoothing by using the past echo information on the target object echo to be tracked and the echo information on the target object echo to be tracked which is detected this time, and calculate tracking information. For example, the tracking information includes the estimated position and the estimated speed of the target object echo to be tracked which is detected this time. The estimated position may be calculated based on an average value (for example, a weighted average value) of the estimated position and the position of the representative point of the target object echo to be tracked which is detected this time. The estimated velocity vector may be calculated based on the estimated position of the target object echo tracked in the past, the estimated positions of the target object echo to be tracked which is detected this time, and a time difference between the detection timings of these echoes.

The smoothing processor 13 may output the tracking information to the display unit 96, and store it in the tracking target DB 100. The tracking information stored in the tracking target DB 100 may be read by the gate processor 11 described above, and may be used for a calculation of the estimated position at the detection timing of the next tracking target.

The smoothing processor 13 may also be omitted. However, more probable position and speed may be calculated for the target object echo to be tracked by providing the smoothing processor 13. Therefore, for example, the tracking performance may improve.

Description of Concrete Example

The above processing is concretely described using FIGS. 4 to 6. FIG. 6 is a table illustrating a concept of the scoring. Note that, here, the detection timing of the target object echo to be tracked is t2, and the detection timing of the target object echo tracked last time is t1. Moreover, since the concrete calculating method is described above, description thereof is omitted in the following.

A target object echo ED0(t1) to be tracked which is detected at a time t1 may include, as the tracking information, the estimated position EP0(t1) and the estimated velocity vector Ev0(t1).

The gate processor 11 may calculate the estimated position 101 of the target object echo to be tracked which is detected at a time t2 based on the tracking information, and set the scoring target area 110. The gate processor 11 may extract a plurality of target object echoes ED1(t2), ED2(t2), ED3(t2), ED4(t2), ED5(t2), ED6(t2), ED7(t2), and ED8(t2) within the scoring target area 110 from the plurality of detected target object echoes.

The tracking target determinator 12 may set the wake area 131 and the wake area 132 on the basis of the estimated position 101 as described above.

The tracking target determinator 12 may detect a spatial relationship of a representative point EP1(t2) of the target object echo ED1(t2), a representative point EP2(t2) of the target object echo ED2(t2), a representative point EP3(t2) of the target object echo ED3(t2), a representative point EP4(t2) of the target object echo ED4(t2), a representative point EP5(t2) of the target object echo ED5(t2), a representative point EP6(t2) of the target object echo ED6(t2), a representative point EP7(t2) of the target object echo ED7(t2), and a representative point EP8(t2) of the target object echo ED8(t2), and the wake area 131 and the wake area 132.

As illustrated in FIG. 5, the representative point EP1(t2) may not be included within the wake area 131 and the wake area 132. On the other hand, the representative points EP2(t2), EP3(t2), and EP4(t2) may be included within the wake area 131, and the representative points EP5(t2), EP6(t2), EP7(t2), and EP8(t2) may be included within the wake area 132.

Therefore, as illustrated in FIG. 6, the target object echo ED1 may not be subject to the deduction of the scoring point, but the target object echoes ED2-ED8 may be subject to the deduction of the scoring point.

As illustrated in FIG. 6, the scoring module 123 may score the target object echoes ED1-ED8 while taking it into consideration so that the scoring points of the target object echoes ED2-ED8 are deducted.

The determining module 124 may determine the target object echo ED1 with the highest scoring point to be the target object echo to be tracked this time. Note that, if the configuration and the method of this embodiment are not used, the target object echo (the echo of the wake) ED2 may unintentionally be determined as a target object echo to be tracked as illustrated in FIG. 6, but such a misjudgment can be reduced by using the configuration and the method of this embodiment.

Therefore, by using the configuration and the method of this embodiment, it can reduce that the echo of the wake near the movable body is erroneously tracked as the target object echo to be tracked.

Note that, in the above description, although the angle $\Delta\theta L$ of the wake area 131 and the angle $\Delta\theta R$ of the wake area 132 are set as 20°, this angle is one example and may be other angles. Moreover, the angle ranges on both sides of the wake reference line LswL in the wake area 131 may be the same or may be different. That is, the area on the port side of the wake reference line LswL and the area on the stern side of the wake reference line LswL in the wake area 131 may be the same or may be different. The area on the starboard side of the wake reference line LswR and the area on the stern side of the wake reference line LswR in the wake area 132 may be the same or may be different.

Figure 7A:
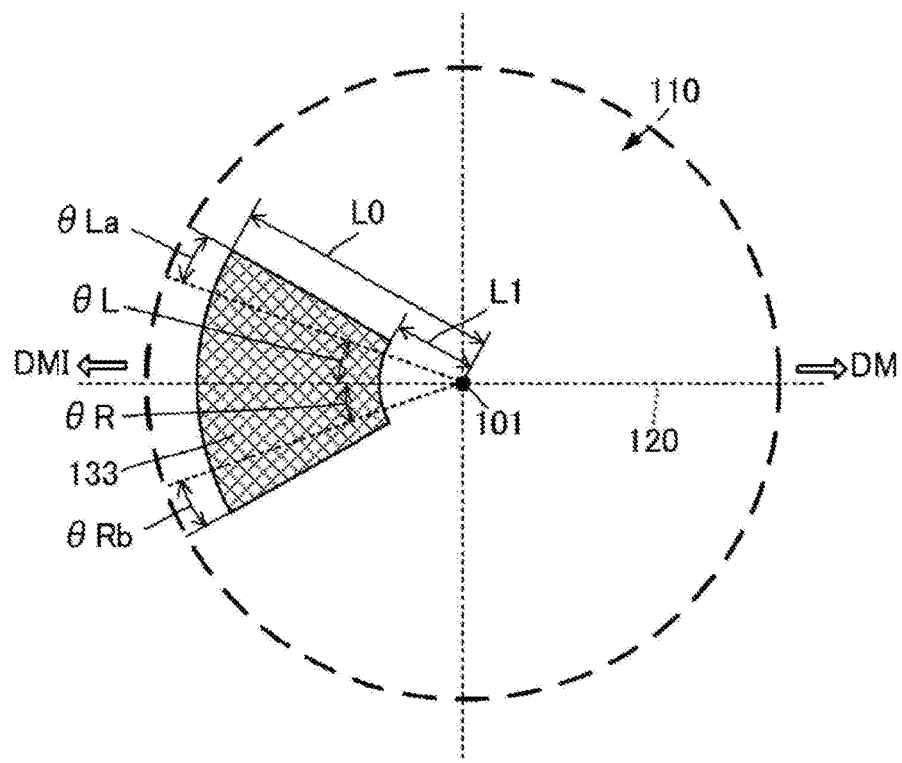
FIGS. 7A and 7B are views illustrating one example of the shape of a wake area.
Figure 7B:
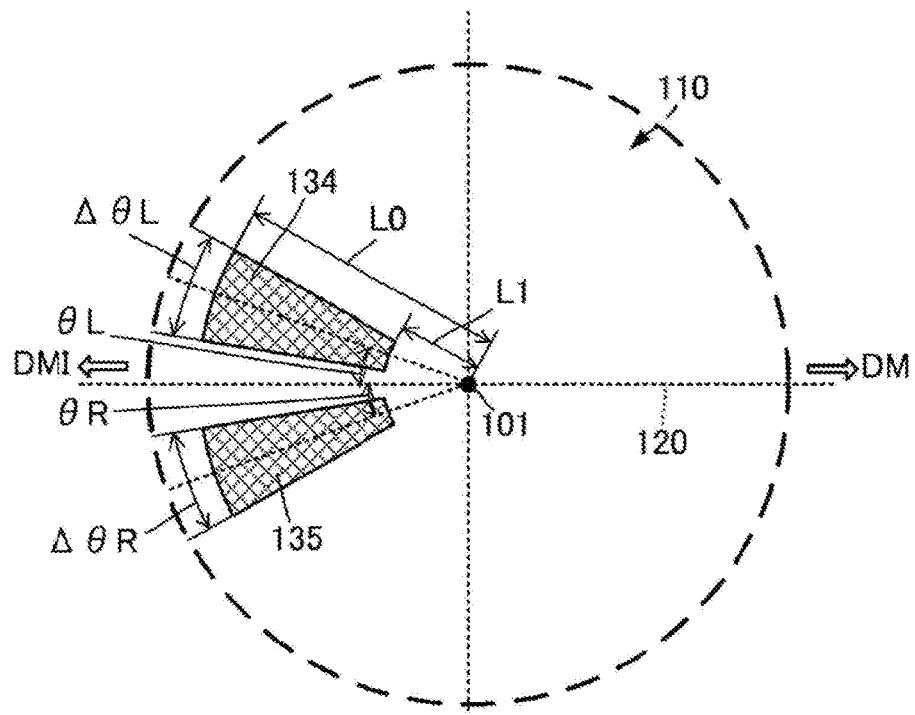

Moreover, the wake area is not limited to the shape described above, but may have the shapes as illustrated in FIGS. 7A and 7B. FIGS. 7A and 7B are views illustrating examples of the shape of the wake areas.

A wake area 133 illustrated in FIG. 7A has a fan shape with its vertex located at the estimated position 101, where an arc located at a distance L1 from the estimated position 101 is an inner edge, and an arc located at a distance L0 (>L1) from the estimated position 101 is an outer edge. The wake area 133 may have a shape spreading at a given angle toward the port side and the starboard side from a line 120 which passes through the estimated position 101 and extends in the opposite direction DMI of the estimated moving direction DM. In the example of FIG. 7A, the wake area 133 has a shape where a side which forms an angle $\theta L$+an angle $\theta La$ on the port side with respect to the line 120 is a left end, and a side which forms an angle $\theta R$+an angle $\theta Ra$ on the starboard side with respect to the line 120 is a right end. Here, the angle $\theta La$ is, for example, about a half (½) of $\Delta\theta L$, and the angle $\theta Ra$ is, for example, about a half (½) of $\Delta\theta R$.

Even if the wake area 133 is set as described above, the erroneous tracking of the echoes of the wakes can be reduced. Further, in this setting, the wake area 133 may not include a neighborhood area of the estimated position 101 (an area on the estimated position 101 side from the arc at the distance L1). Therefore, even if the speed of the movable body to be tracked becomes slower, the echo of the movable body may be difficult to enter into the wake area 133. Therefore, it can reduce that a correction of the deduction of the scoring point to the echo of the movable body is performed, while deducting the scoring points of the echoes of the wakes.

Note that the distance L1 and the distance L0 can be adjusted suitably. For example, the distance L1 can be set according to an estimated variation of the speed of the target movable body and the size of the movable body. Moreover, for example, the distance L0 can be set based on a degree of attenuation of the echoes of the wakes within the radius rm of the scoring target area 110.

The wake area 134 illustrated in FIG. 7B may be an area obtained by excluding from the wake area 131 an area near the estimated position 101 and the neighborhood area of the arc of the scoring target area 110. That is, it may be an area obtained by excluding a partial area of the wake area 131 from the estimated position 101 to the arc at the distance L1, and a partial area of the wake area 131 from the arc at the distance L0 to the arc of the scoring target area 110.

Similarly, the wake area 135 may be an area obtained by excluding from the wake area 132 an area near the estimated position 101 and the neighborhood area of the arc of the scoring target area 110. That is, it may be an area obtained by excluding a partial area of the wake area 132 from the estimated position 101 to the arc at the distance L1, and a partial area from the arc at the distance L0 to the arc of the scoring target area 110.

Even if such a wake area 134 and a wake area 135 are set, the erroneous tracking of the echoes of the wakes can be reduced. Further, in this configuration, even if the speed of the movable body becomes slower, it can prevent that the echo of the movable body enters into the wake areas 134 and 135. In particular, in this configuration, the wake area may not be set in the opposite direction DMI, from the estimated position 101 to the arc of the scoring target area 110. That is, the wake area 134 and the wake area 135 may be set separately so as to sandwich the opposite direction DMI. Therefore, even if the speed of the movable body becomes slower greatly, it can prevent that the echo of the movable body enters into the wake area 134 and the wake area 135.

Figure 8:
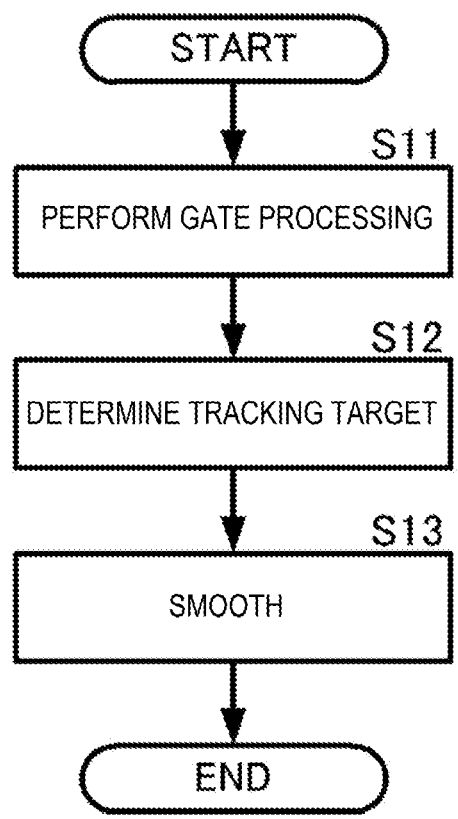
FIG. 8 is a flowchart illustrating an outline flow of the tracking according to this embodiment.
Figure 9:
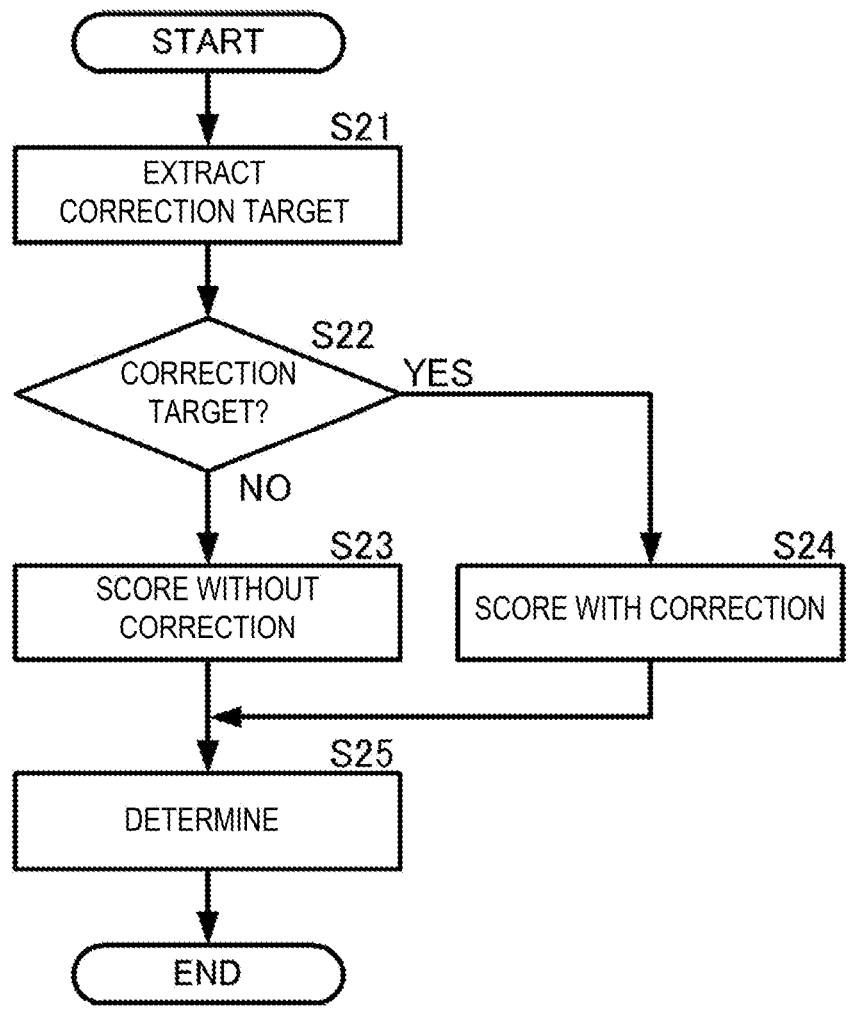
FIG. 9 is a flowchart of a determination of a tracking target according to this embodiment.

In the above description, although the tracking is implemented by the plurality of functional parts, this tracking may be programmed and stored in a storage medium, and an arithmetic processing device, such as the CPU, may read and execute the program. In this case, processings illustrated in FIGS. 8 and 9 may desirably be executed. FIG. 8 is a flowchart illustrating an outline flow of the tracking according to this embodiment. FIG. 9 is a flowchart of the determination of the tracking target according to this embodiment. Note that, since the concrete processings are mostly described above, the already-described parts are omitted.

As illustrated in FIG. 8, the arithmetic processing device performs a gate processing (S11). The gate processing may be to set the scoring target area 110 and extract a target object echo which exists within the scoring target area 110 from a plurality of detected target object echoes, as the target object echo to be scored.

The arithmetic processing device may determine a target object echo to be tracked from the target object echoes to be scored (S12). The arithmetic processing device may perform the smoothing by using the target object echo to be tracked and the target object echo tracked in the past (S13), and generate the tracking information.

The determination of the tracking target at Step S12 may be executed as illustrated in FIG. 9.

The arithmetic processing device may set the wake area, and extract the candidate for the correction of the scoring point by using the wake area (S21). In detail, the arithmetic processing device may extract the representative point within the wake area as the candidate for the correction of the scoring point.

If the representative point is not the candidate for the correction of the scoring point (S22: NO), the arithmetic processing device may perform scoring to the target object echo without the correction (S23). If the representative point is the candidate for the correction of the scoring point (S22: YES), the arithmetic processing device may perform the scoring to the target object echo with the correction (S24).

The arithmetic processing device may determine the target object echo to be tracked based on the scored result (S25).

By such processings, it can reduce the erroneous tracking of the echo of the wake, and thereby, the echo of the movable body can be tracked more accurately.

Note that the scored point may be corrected in the above. However, the scoring may be performed after correcting the echo information on the target object echo to be corrected so that the scoring point becomes lower (for example, a correction of changing the area of the echo). Alternatively, the target object echo to be corrected and the target object echo not to be corrected may be differently weighted when being scored. For example, the weighting may be performed to the target object echoes to be corrected so that the scoring point becomes lower, and the weighting may be performed to the target object echo not to be corrected so that the scoring point becomes higher.

Moreover, in the above description, the radar device may be mounted on the water surface movable body, such as the ship. However, the above configuration may be applied to a land installation type radar device which is installed in given land, such as a strait.

Moreover, in the above description, although the scoring target area 110 has the circular area, it may have other shapes, such as a fan and a rectangle.

Moreover, in the above description, the correction of the scoring point may be performed, while statistically considering the frequency of the representative point of the target object echo to be scored having entered into the wake area in the past.

Moreover, in the above configuration, the scoring point may be corrected so that it becomes higher on the opposite side of the wake area (the moving direction side of the estimated position of the target object echo to be tracked).

Moreover, in the above configuration, the scoring target area 110 may first be set, and the wake area may then be set. However, it is also possible to set the wake area first and to change the shape of the scoring target area 110 according to the wake area. For example, the circular scoring target area 110 is made not to include a part corresponding to the wake area. Alternatively, if a plurality of wake areas are set, the circular scoring target area 110 may be made not to include the plurality of wake areas and areas therebetween.

Moreover, in the above description, after detecting the representative point by the tracking representative point detector 95, the different scorings of the representative points (target object echoes) may be applied by the tracker 10 depending on the inside and the outside of the wake area. However, the wake area may be set first, and the tracking representative point detector 95 may not detect the representative point as the target to be tracked if the target object echo is included within the wake area.

Moreover, in the above description, the area with the high possibility of the wake being produced may be used as the target area of the correction of the scoring point. However, without being limited to the echo resulting from the wake, an area where an unnecessary echo resulting from the structure or behavior of the ship or other ships tends to be produced may be used as the area for the correction of the scoring point.

For example, when setting the area for the correction of the unnecessary echo resulting from the structure or behavior of the ship, the area to be corrected can be set by using the position, the velocity vector, etc. of the ship. Moreover, when setting the area for the correction to the unnecessary echo resulting from the structure or behavior of another ship, the area to be corrected can be set by using the position, the velocity vector, etc. of another ship.

Moreover, the area to be corrected, such as the wake area, can also be set by a user interface (not illustrated), while an operator looks at the detection image displayed on the display unit 96.

Terminology

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules executed by a computing system that includes one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processor. A processor can be a microprocessor, but in the alternative, the processor can be a controlling module, microcontrolling module, or state machine, combinations of the same, or the like. A processor can include electrical circuitry configured to process computer-executable instructions. In another embodiment, a processor includes an application specific integrated circuit (ASIC), a field programmable gate array (FPGA) or other programmable device that performs logic operations without processing computer-executable instructions. A processor can also be implemented as a combination of computing devices, e.g., a combination of a digital signal processor (DSP) and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controlling module, or a computational engine within an appliance, to name a few.

Conditional language such as, among others, "can," "could," "might" or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Any process descriptions, elements or blocks in the flow views described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C. The same holds true for the use of definite articles used to introduce embodiment recitations. In addition, even if a specific number of an introduced embodiment recitation is explicitly recited, those skilled in the art will recognize that such recitation should typically be interpreted to mean at least the recited number (e.g., the bare recitation of "two recitations," without other modifiers, typically means at least two recitations, or two or more recitations).

It will be understood by those within the art that, in general, terms used herein, are generally intended as "open" terms (e.g., the term "including" should be interpreted as "including but not limited to," the term "having" should be interpreted as "having at least," the term "includes" should be interpreted as "includes but is not limited to," etc.).

For expository purposes, the term "horizontal" as used herein is defined as a plane parallel to the plane or surface of the floor of the area in which the system being described is used or the method being described is performed, regardless of its orientation. The term "floor" can be interchanged with the term "ground" or "water surface." The term "vertical" refers to a direction perpendicular to the horizontal as just defined. Terms such as "above," "below," "bottom," "top," "side," "higher," "lower," "upper," "over," and "under," are defined with respect to the horizontal plane.

As used herein, the terms "attached," "connected," "mated," and other such relational terms should be construed, unless otherwise noted, to include removable, moveable, fixed, adjustable, and/or releasable connections or attachments. The connections/attachments can include direct connections and/or connections having intermediate structure between the two components discussed.

Numbers preceded by a term such as "approximately," "about," and "substantially" as used herein include the recited numbers, and also represent an amount close to the stated amount that still performs a desired function or achieves a desired result. For example, the terms "approximately," "about," and "substantially" may refer to an amount that is within less than 10% of the stated amount. Features of embodiments disclosed herein are preceded by a term such as "approximately," "about," and "substantially" as used herein represent the feature with some variability that still performs a desired function or achieves a desired result for that feature.

It should be emphasized that many variations and modifications may be made to the above-described embodiments, the elements of which are to be understood as being among other acceptable examples. All such modifications and variations are intended to be included herein within the scope of this disclosure and protected by the following claims.

DESCRIPTION OF REFERENCE CHARACTERS

10: Tracker
11: Gate Processor
12: Tracking Target Determinator
13: Smoothing Processor
90: Radar Device
91: Antenna
92: Transmitter
93: Transmission/Reception Switch
94: Receiver
95: Tracking Representative Point Detector
96: Display Unit
100: Tracking Target Database
101: Estimated Position
110: Scoring Target Area
120: Line
121: Wake Area Setting Module
122: Correction Target Echo Extracting Module
123: Scoring Module
124: Determining Module
131, 132, 133, 134, 135: Wake Area
DM: Estimated Moving Direction
DMI: Opposite Direction
ED0, ED1, ED2, ED3, ED4, ED5, ED6, ED7, ED8: Target Object Echo
EP0: Estimated Position
EP1, EP2, EP3, EP4, EP5, EP6, EP7, EP8: Representative Point
Ev0: Estimated Velocity Vector
L0, L1: Distance
LswL: Wake Reference Line
LswR: Wake Reference Line

What is claimed is:

1. A tracking device, comprising:
processing circuitry configured to:
set an area in which an unnecessary echo tends to be generated based on one of a structure and behavior of a ship, to be a correction target area, wherein the correction target area is a wake area,
extract a target object echo within the wake area from a plurality of detected target object echoes, as a correction target echo,
score a matching level between previous echo information on a target object echo that is a previous tracking target and detected echo information on each of the plurality of detected target object echoes, based on the previous echo information, the detected echo information, and the correction target echo, and determine a target object echo as a current tracking target from the plurality of target object echoes, by using the scored result, and set the wake area with reference to a current estimated position of the previous tracking target, by using the previous echo information, wherein the wake area is set to have approximately 39° with respect to the estimated position, a bisector of the angle of 39° extending to a direction opposite from an estimated moving direction of the previous tracking target, and the wake area is divided into a plurality of subareas in the angular direction, having the opposite direction of the estimated moving direction therebetween.

2. The tracking device of claim 1, wherein the processing circuitry scores the target object echo within the wake area to be lower than that outside the wake area.

3. The tracking device of claim 1, wherein the processing circuitry is further configured to detect a target object echo included in a scoring target area set with reference to the estimated position, wherein the processing circuitry uses only the detected target object echo for extracting the correction target echo.

4. The tracking device of claim 1, wherein the processing circuitry is further configured to perform smoothing by using a position of the current tracking target object echo and the estimated position.

5. The tracking device of claim 1, wherein the processing circuitry extracts the correction target echo by using representative points of the plurality of detected target object echoes.

6. A tracking method, comprising the steps of:

setting an area in which an unnecessary echo tends to be generated based on one of a structure and behavior of one of a ship and another ship, to be a correction target area, wherein the correction target area is a wake area;

extracting a target object echo within the wake area from a plurality of detected target object echoes, as a correction target echo;

scoring a matching level between previous echo information on a target object echo that is a previous tracking target and detected echo information on each of the plurality of detected target object echoes, based on the previous echo information, the detected echo information, and the correction target echo;

determining a target object echo as a current tracking target from the plurality of target object echoes, by using the scored result; and setting the wake area with reference to a current estimated position of the previous tracking target, by using the previous echo information, wherein the wake area is set to have approximately 39° with respect to the estimated position, a bisector of the angle of 39° extending to a direction opposite from an estimated moving direction of the previous tracking target, and the wake area is divided into a plurality of subareas in the angular direction, having the opposite direction of the estimated moving direction therebetween.

7. The method of claim 6, further comprising scoring the target object echo within the wake area to be lower than that outside the wake area.

8. The method of claim 6, further comprising detecting a target object echo included in a scoring target area set with reference to the estimated position, wherein the correction target echo is extracted using only the detected target object echo.

9. The method of claim 6, further comprising smoothing by using a position of the current tracking target object echo and the estimated position.

10. The method of claim 6, wherein the correction target echo is extracted by using representative points of the plurality of detected target object echoes.

11. A non-transitory computer-readable recording medium storing a control program causing a computer of a tracking device to execute processing, the computer configured to control operation of the device, the processing comprising:

setting an area in which an unnecessary echo tends to be generated based on one of a structure and behavior of a ship, to be a correction target area, wherein the correction target area is a wake area;

extracting a target object echo within the wake area from a plurality of detected target object echoes, as a correction target echo;

scoring a matching level between previous echo information on a target object echo that is a previous tracking target and detected echo information on each of the plurality of detected target object echoes, based on the previous echo information, the detected echo information, and the extraction result of the correction target echo;

determining a target object echo as a current tracking target from the plurality of target object echoes, by using the scored result; and setting a wake area with reference to a current estimated position of the previous tracking target, by using the previous echo information; wherein the wake area is set to have approximately 39° with respect to the estimated position, a bisector of the angle of 39° extending to a direction opposite from an estimated moving direction of the previous tracking target, and the wake area is divided into a plurality of subareas in the angular direction, having the opposite direction of the estimated moving direction therebetween.

12. The medium of claim 11, wherein the processing further comprises:

scoring the target object echo within the wake area to be lower than that outside the wake area.

13. The medium of claim 11, wherein the processing further comprises detecting a target object echo included in a scoring target area set with reference to the estimated position, and the processing uses only the detected target object echo for extracting the correction target echo.

14. The medium of claim 11, wherein the processing further comprises smoothing by using a position of the current tracking target object echo and the estimated position.

15. The medium of claim 11, wherein the correction target echo is extracted by using representative points of the plurality of detected target object echoes.

* * * * *